A. F. BATCHELDER.
CAR TRUCK.
APPLICATION FILED JAN. 29, 1908.
919,305.
Patented Apr. 27, 1909.
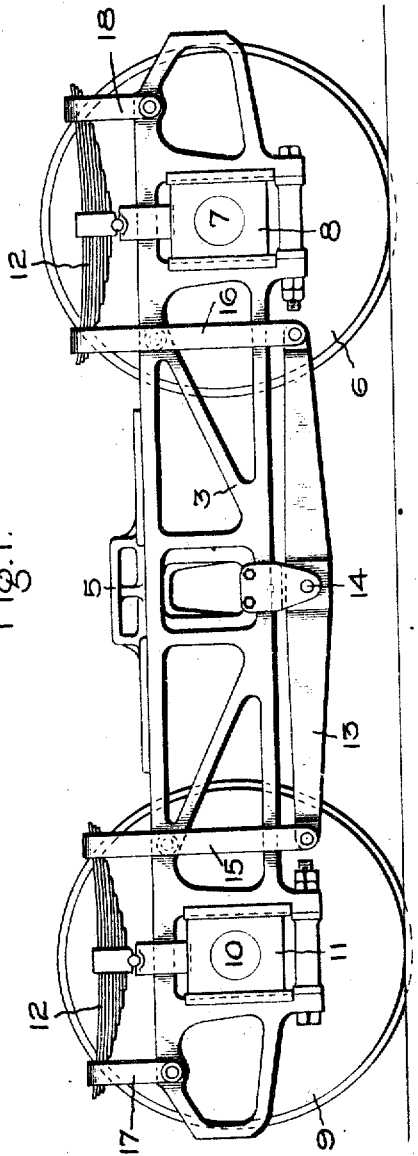
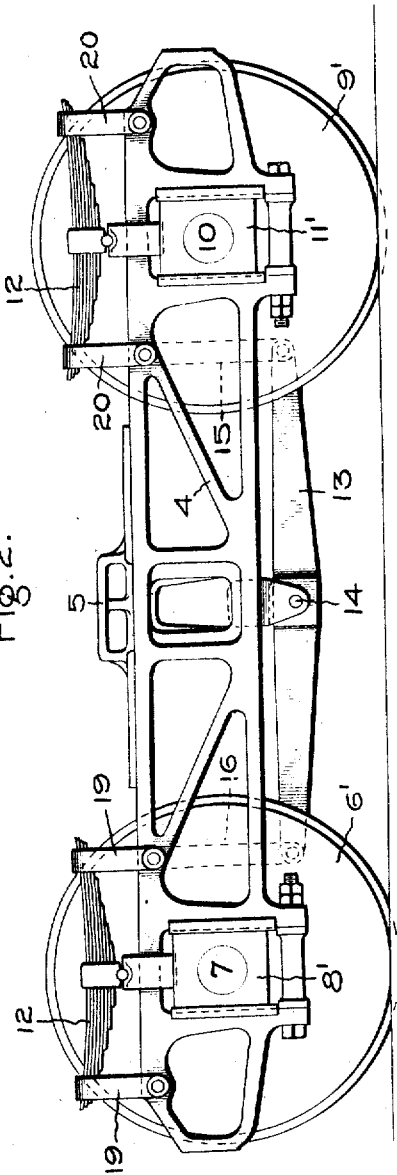
Witnesses:
Marcus L. Byng.
J. Ellis Glen
Inventor:
Asa F. Batchelder,
by Albert H. Davis
Att'y.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

CAR-TRUCK.

No. 919,305.  Specification of Letters Patent.  Patented April 27, 1909.

Application filed January 29, 1908. Serial No. 413,170.

*To all whom it may concern:*

Be it known that I, ASA F. BATCHELDER, a citizen of the United States, residing at Schenectady, county of Schenectady, State of New York, have invented certain new and useful Improvements in Car-Trucks, of which the following is a specification.

My invention relates to trucks for vehicles, and particularly to trucks for cars used on railroads.

In its broad aspect my invention is adapted for use in connection with vehicles of all kinds.

For reasons hereinafter brought out, it is desirable in vehicles, particularly car trucks, that the frame in which the journal boxes of the wheel axles are supported shall, in effect, rest on three points. This is usually stated in this art by saying that the frame must have "three-point suspension". It has heretofore been customary in two axle trucks to mount the truck frame at one end directly on the journal boxes of one of the axles, and to mount the other end of the truck frame through a system of levers upon the other two journal boxes jointly. With this arrangement two of the points of suspension are near one end of the truck on opposite sides thereof, and the third point of suspension is at the other end of the truck approximately midway of its width. I have found that the same advantageous results may be obtained and that the truck construction may be considerably simplified and cheapened by locating the points of suspension, two on one side of the truck and one on the other side.

My invention, therefore, consists in providing means whereby one side frame is, in effect, suspended at two points on the journal boxes on that side, and means whereby the other side frame is, in effect, supported at one point jointly on the journal boxes on that side.

My invention will be more fully understood from the following description taken in connection with the accompanying drawing, in which—

Figure 1 is an elevation of one side of a two axle truck in which my invention is embodied, and Fig. 2 is an elevation of the other side thereof.

While I have shown my invention as applied only to a two axle truck, I wish it understood that it can equally well be applied to a truck having any number of axles, since whereas, in effect, two-point suspension on one side and one-point suspension on the other side may be obtained by the use of suitable arrangements of equalizing levers.

Referring to the drawing, one side frame is shown at 3, and the other side frame at 4, in Figs. 1 and 2, respectively. The bolster, which is supported by the side frames, is shown in outline at 5. Wheels 6, $6^1$ are shown mounted on an axle 7 having journal boxes 8, $8^1$, and wheels 9, $9^1$ are supported on an axle 10 running in journal boxes 11, $11^1$. These journal boxes slide in the frames 3 and 4 in the usual manner. Above each journal box is a spring 12 which is arranged intermediate the truck frame and the journal boxes.

In Fig. 1 the side frame 3 is shown as carrying an equalizing lever 13, pivoted at a point 14 in brackets or lugs located approximately midway of the length of the frame 3. The ends of this lever 13 are connected by links 15 and 16 with ends of the springs 12 resting on the journal boxes 11 and 8, the other ends of these springs 12 being connected to the frame 3 near its ends by links 17 and 18. With this arrangement it is clear that the frame 3 is in effect supported at the point 14 on the journal boxes 11 and 8 jointly.

Referring to Fig. 2, the frame 4 is there shown supported at one end on journal box $8^1$ through the links 19 and the spring 12, and at the other end on the journal box $11^1$ through the links 20 and the spring 12. With this arrangement it is apparent that the side frame 4 is in effect supported at one end directly on the journal box $8^1$ and on the other end directly on the journal box $11^1$.

With a truck having the system of suspension above described, raising of either of the wheels 9 or 6 and, therefore, raising of the journal boxes 11 or 8 will result in lifting the truck frame at the point 14 and rotating it about an axis drawn through the two points of support on the other side of the truck. Raising of the wheel $6^1$ and, therefore, the journal box $8^1$ will result in raising the truck frame at the corner where the journal box $8^1$ is located and rotating the frame about the axis drawn through the point of support at the other end of that side frame and the single point of support midway the length of the other side frame. Similarly, raising of the wheel $9^1$ and, therefore, the journal box $11^1$ will raise the truck frame at the corner in which the journal box $11^1$ is located and will rotate it about the axis passing through the point of support at the other end of that side frame and the single point of support midway the length of the other side frame. The truck frame has, therefore, "three-point suspension".

What I claim as new and desire to secure by Letters Patent of the United States, is,—

1. In a car truck, a plurality of wheel axles, journal boxes therefor, side frames in which said journal boxes are supported, means for supporting one side frame at two points on the journal boxes on that side, and means for supporting the other side frame at one point jointly on the journal boxes on that side.

2. In a car truck, a plurality of wheel axles, journal boxes therefor, side frames in which said journal boxes are supported, a lever system through which one of the side frames is supported at two points on the journal boxes in that side frame, and another lever system through which the other side frame is supported at one point jointly on the journal boxes in that side frame.

3. In a car truck, a plurality of wheel axles, journal boxes therefor, side frames in which said journal boxes are supported, a lever system through which one of the side frames is supported near each end on the journal boxes in that side frame and another lever system through which the other side frame is supported near its middle jointly on the journal boxes in that side frame.

4. In a car truck, two wheel axles, journal boxes therefor, side frames in which said journal boxes are supported, means for supporting one side frame at one end on one journal box in said side frame and at the other end upon the other journal box in said side frame, and means for supporting the other side frame through an equalizing system of levers jointly on the two journal boxes in that side frame.

5. In a car truck, two wheel axles, journal boxes therefor, side frames in which said journal boxes are supported, a lever system through which one of said side frames is supported at one end on one journal box in said side frame and at the other end on the other journal box in said side frame, and another lever system through which the other side frame is supported near its middle jointly on the journal boxes in that side frame.

6. In a car truck, two wheel axles, journal boxes therefor, side frames in which said journal boxes are supported, a leaf spring arranged above each journal box with its middle point resting thereon, links for hanging one of the side frames directly on two of said springs, and links and an equalizing lever and links for hanging the other side frame on the other two springs jointly.

7. In a car truck, two wheel axles, journal boxes therefor, side frames in which said journal boxes are supported, a leaf spring above each of said journal boxes and having its middle point resting thereon, links for connecting the ends of said springs on one side of said truck directly to the side frame, links for connecting one end of each of the springs on the other side of the truck directly to that side frame, and links and an equalizing lever for connecting the other ends of said last mentioned springs to a point on that side frame approximately midway of its length.

In witness whereof, I have hereunto set my hand this 27th day of January, 1908.

ASA F. BATCHELDER.

Witnesses:
HELEN ORFORD,
BENJAMIN B. HULL.